UNITED STATES PATENT OFFICE.

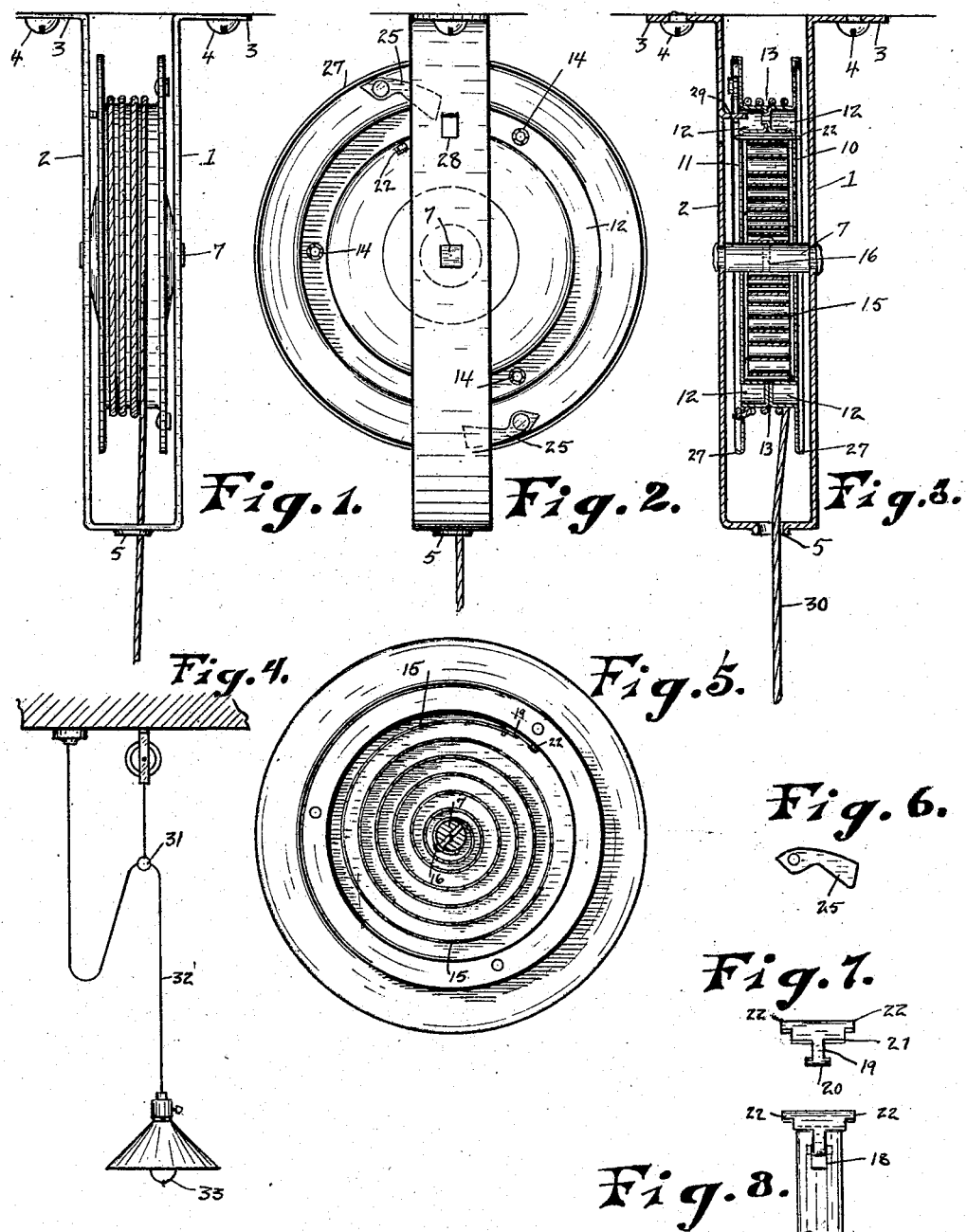

MARTIN N. NARUM, OF MILWAUKEE, AND PETER L. JACOBSON, OF NORWAY, WISCONSIN.

CORD-SUPPORT FOR ELECTRIC LIGHTS.

No. 915,997.      Specification of Letters Patent.      Patented March 23, 1909.

Application filed November 5, 1906. Serial No. 341,992.

*To all whom it may concern:*

Be it known that we, MARTIN N. NARUM and PETER L. JACOBSON, citizens of the United States, residing at Milwaukee, county of Milwaukee, and State of Wisconsin, and at town of Norway, Racine county, Wisconsin, have invented new and useful Improvements in Cord-Supports for Electric Lights, of which the following is a specification.

Our invention relates to improvements in cord supports for electric lights.

The object of our invention is to provide a comparatively inexpensive device by means of which an electric light may be supported over a desk or at any point where desired, irrespective of the ceiling connection of the cord, and raised or lowered at pleasure.

Incidentally our invention also has reference to certain features of construction, whereby the supporting device and all parts thereof may be stamped or pressed into the desired shape.

In the following description reference is had to the accompanying drawings in which, Figure 1 is an edge view of a device embodying our invention. Fig. 2 is a side view of the same. Fig. 3 is a vertical sectional view drawn on the axis of the supporting shaft and hangers. Fig. 4 is a side view showing the same as it is applied in supporting a cord with an electric lamp. Fig. 5 is a view of the inner face of one of the plates showing the winding spring. Fig. 6 is a detail view of one of the dogs for holding the pulley against the tension of the spring. Fig. 7 is a detail view of the device for connecting the outer end of the spring with the pulley plates. Fig. 8 is a similar view showing the device as it is connected with the end of the spring.

Like parts are identified by the same reference characters throughout the several views.

A hanger is formed of a strip of sheet metal bent U-shape to form side bars 1 and 2 and attachment flanges 3 adapted to be secured to the ceiling by screws 4. The base of the hanger which connects the side bars 1 and 2 is provided with an aperture 5 and near the center of each side bar a square aperture is punched which is adapted to receive a squared end of a pulley supporting shaft 7. The pulley mounted on this shaft comprises disks or plates 10 and 11, having an inwardly projecting channel 12 formed therein near the periphery, the channel being formed by pressing the material composing the disk inwardly to form a groove or channel in its outer face and an annular rib on its inner face. The two disks are placed together with the ribs abutting each other, as shown at 13 in Fig. 3. At the base of the channel one of the ribs is punched without removing the metal to form an eyelet 14, and the other rib is punched and the metal removed to form an aperture of sufficient size to receive said eyelet, the metal composing the eyelet being pressed outwardly and riveted within the channel of the last mentioned member, the two pulley disks being thus secured together.

A helical spring 15 is secured at its inner end to the shaft 7 by means of a pin 16 which extends through the end of the spring and into an aperture in the shaft, as clearly shown in Fig. 5. The outer end of the spring is provided with an aperture 18 adapted to receive a fastening member provided with a tongue 19 which enters the aperture 18 and which is provided with a cross head 20 to prevent the withdrawal of the tongue when it has been manipulated into position. The fastening member is also provided with a cross head 21 at the other end of the tongue of a width equal to the space between the plates 10 and 11 and having projections 22 which extend through small apertures in the plates, whereby the fastening member is securely locked to the plates as well as to the spring.

One of the disks is provided with a set of dogs 25 pivoted to its outer surface near the periphery, said dogs being adapted to swing inwardly over the channel 12 in that plate. The inward movement of the dog is limited by a peripheral bead 27 on the plate against which the short end of the dog is adapted to impinge. The hanger bar 2 is cut and pressed inwardly to form an aperture 28, as shown in Fig. 2, and the inwardly projecting metal from said aperture forms a stop 29 which stop projects into the channel 12 and is adapted to be engaged by either of the dogs 25 unless said dogs are thrown or held outwardly by centrifugal action.

A cord 30 is wound upon the pulley formed by the plates 10 and 11 in the space between the outer margins of said plates and the spacing ribs which abut each other at 13. This cord is secured at 31 to the cord 32 which supports the electric lamp 33, whereby said lamp may be supported in any desired position and may be raised or lowered to suit the convenience of the user. It will be understood that the spring 15 tends to wind up the pulley and with it the cord 30 thereon but that the pulley is normally locked in position by one of the dogs 25 engaging the stop 29. When it is desired to raise the lamp the cord 32 is first drawn outwardly and then released or lifted quickly thus permitting the pulley to revolve with sufficient rapidity to carry the dogs 25 past the stop without swinging inwardly to locking position. When the lamp has been raised to the desired height its movement is restrained by pulling on the cord, thus permitting one of the dogs to drop into locking position.

Having thus described our invention what we claim as new and desire to secure by Letters Patent is,

1. The combination with a support provided with a depending electric light cord and lamp, of a pulley supporting bracket comprising a strip of metal bent U-shaped and forming supporting hanger bars, a spring actuated pulley journaled in said hanger bars, and provided with pivotal stop dogs adapted to swing outwardly centrifugally, and a cord wound on said pulley and extending through an aperture in the base portion of said bracket,—one of said hanger bars having a portion partially cut out and bent inwardly to form a tongue adapted to be engaged by the stop dogs when the latter are in normal position.

2. In a device of the described class, the combination with a supporting bracket, of a pair of disks having annular channels in their outer faces, with the material of the disk pressed inwardly to form a spacing rib, said disks being arranged with the ribs abutting and forming an interior spring retaining cavity, a supporting shaft for said disks, a winding spring connected with the shaft and with the disks, stops normally holding the disks against a winding movement, and a cord wound upon the spacing ribs between the outer margins of the disks.

3. In a device of the described class, the combination with sheet metal disks, having inwardly projecting spacing ribs and connected with each other to form a pulley, a winding spring located in the space formed by said disks and spacing ribs, a centrally disposed shaft connected with the inner end of the winding spring, and a fastening member connecting the outer end of the winding spring with the disks,—said fastening member comprising a tongue adapted to extend through an aperture of the winding spring, and having a cross head adapted to be manipulated through said aperture, and another cross head having projections extending through apertures in the disks.

4. In a device of the described class, the combination of a pulley supporting bracket comprising a strip of metal bent U-shaped and forming supporting hanger bars, a shaft carried by said hanger bars, a pulley mounted on the shaft and having inwardly extending annular channels in its side faces, one of said hanger bars having a portion pressed inwardly into one of said channels to form a stop, dogs mounted on said pulley near its periphery and adapted to swing inwardly by gravity to engage the stop when the pulley is slowly revolved.

5. In a device of the described class, the combination of a set of sheet metal disks, having the material pressed inwardly to form annular channels in one face and spacing ribs in the other face, said disks being arranged with the spacing ribs abutting each other and forming a central spring retaining cavity, a winding spring located within the cavity, one of said ribs being provided with apertures at suitable intervals and the other of said ribs having the metal thereof punched inwardly through the apertures in the first mentioned rib and expanded and forming a retaining eyelet, whereby said disks constitute a pulley.

In testimony whereof we affix our signatures in the presence of two witnesses.

MARTIN N. NARUM.
PETER L. JACOBSON.

Witnesses:
LEVERETT C. WHEELER,
Mrs. L. HARMUTH.